Feb. 26, 1929.
M. W. GOLDBERG
1,703,231
TRUNNION BEARING GUARD
Filed Oct. 31, 1927
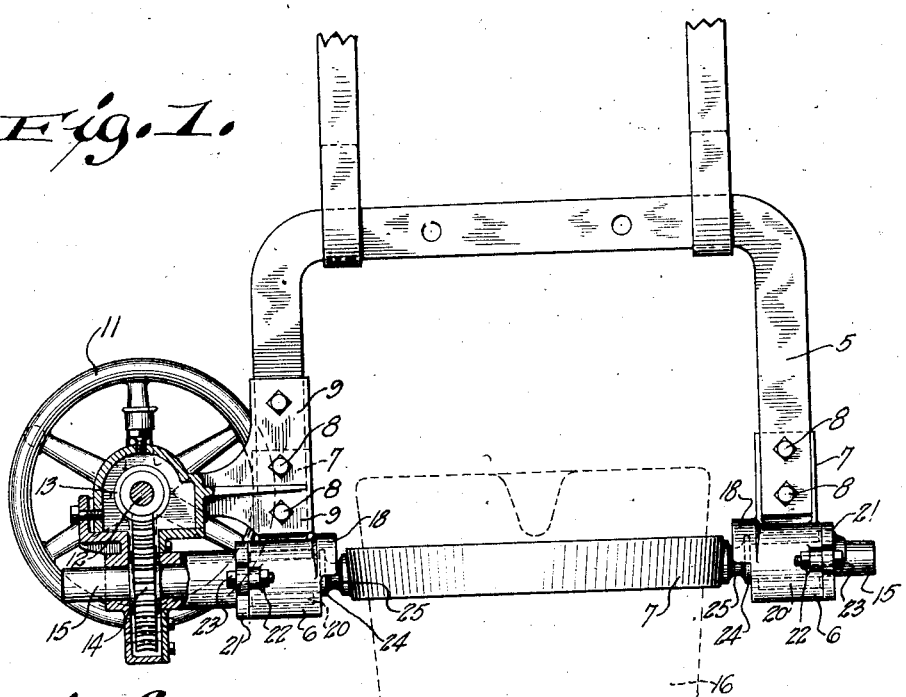
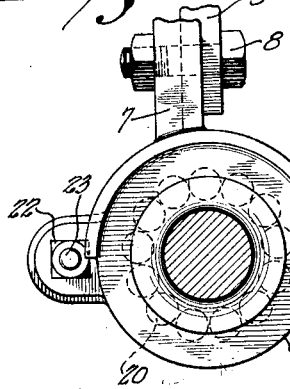
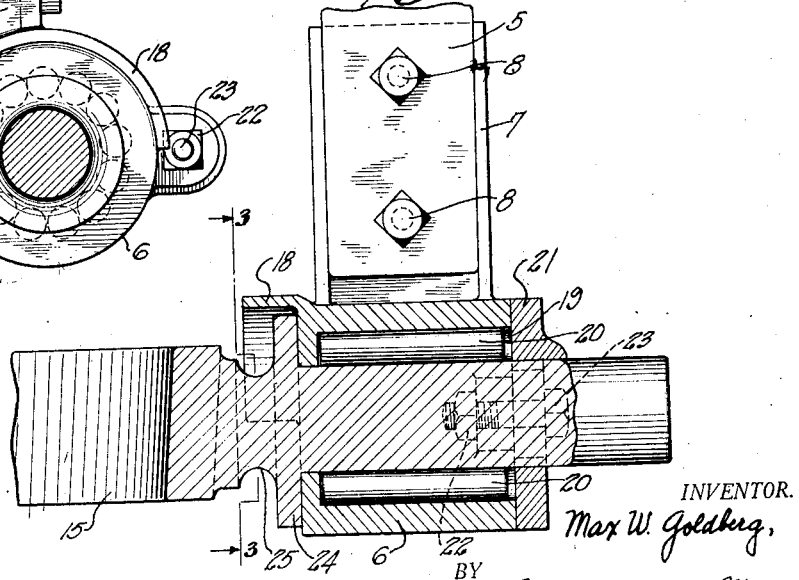
INVENTOR.
Max W. Goldberg,
BY
Morsell, Keeney & Morsell
ATTORNEYS Patented Feb. 26, 1929.

1,703,231

UNITED STATES PATENT OFFICE.

MAX W. GOLDBERG, OF PORT WASHINGTON, WISCONSIN, ASSIGNOR TO MODERN POURING DEVICE COMPANY, OF PORT WASHINGTON, WISCONSIN, A CORPORATION OF WISCONSIN.

TRUNNION-BEARING GUARD.

Application filed October 31, 1927. Serial No. 230,036.

This invention relates to improvements in trunnion bearing guards, adapted to be used in metal pouring devices.

Heretofore, in metal pouring devices, the bearings, at the point where the trunnions of the container holder enter them, have been entirely unprotected. As a result, molten metal which has been spilled over the sides of the container has become lodged around the bearings, and has there hardened or corroded, thereby preventing the trunnions from turning within the bearings.

It is one of the objects of the present invention to provide a guard for the trunnion bearings which will obviate the aforementioned objection.

It is a more specific object of this invention to provide a semi-circular protecting flange on the inner end of each bearing, and a groove below the flange extending around the circumference of each of the trunnions.

A further object of the invention is to provide a trunnion bearing guard which is simple in construction and operation, and is well adapted for the purpose described.

With the above and other objects in view, the invention consists of the improved trunnion bearing guard and its parts and combinations as set forth in the claims and all equivalents thereof.

In the accompanying drawing in which the same reference characters indicate the same parts in all of the views:

Fig. 1 is a front elevation of a portion of a metal pouring device, showing the trunnion bearing guards in combination therewith;

Fig. 2 is a sectional view of one of the bearings and trunnion showing the bearing guard; and Fig. 3 is a section taken on the line 3—3 of Fig. 2.

Referring to the drawing, the numeral 5 designates a bail on each end of which is a trunnion bearing 6. The trunnion bearings are provided with upwardly extending brackets 7 by which the bearings are secured to the bail arms by bolts and nuts 8. Connected to the bail by brackets 9 is the container tilting mechanism which comprises a control wheel 11 rigidly secured to a rod 12 which has rigidly secured thereto a worm wheel 13 for rotating the gear wheel 14 which in turn rotates the trunnion 15. The turning of the trunnion causes the tilting of the container 16 which is positioned within the container holder 17.

One of the novel features of this invention resides in the construction of the trunnion bearings 6. These bearings are formed on their inner ends with semi-circular flanges 18. While semi-circular flanges are the preferred type, it is not desired to limit the invention to flanges of this particular shape. The flanges may be constructed in various ways without departing from the spirit of the invention. The bearings are provided with an annular space 19 between the trunnions and the bearing to accommodate bearing rollers 20. The rollers are held in place at the outer end of the bearings by plates 21 secured to the bearings by bolts 22 and nuts 23.

The trunnions are provided with circumferential flanges 24 which are adjacent the inner ends of the bearings 6. Adjacent to these flanges, the trunnions have circumferential grooves 25 formed therearound. These grooves are a further novel feature of the invention. As they are located directly below the edges of the semi-circular flanges 18, any molten metal which splashes on and drips off of the flanges will be received by the grooves 25 and thereby kept away from contact with the points where the flanges 24 meet the bearings 6. Furthermore, when the trunnions are turned, the molten metal will become dislodged from the grooves and fall to the floor.

From the foregoing description, it may be seen that the improved trunnion bearing guard is of very simple construction and is well adapted for the purpose described.

What I claim as my invention is:

1. In a bearing, a shaft mounted in said bearing and projecting therefrom, and a protecting flange on the bearing overhanging and extending partly around a portion of said shaft which projects from the bearing, all parts of said flange being spaced from said shaft, and the said shaft being exposed for a distance inwardly from the end of the flange.

2. In a bearing, a shaft mounted in said bearing and projecting therefrom and having a groove on a portion of said shaft which projects from the bearing, and a protecting flange on the bearing above the said groove.

3. In a bearing, a shaft mounted in said bearing and projecting therefrom, a circumferential flange on said shaft adjacent the bearing, said shaft having a groove adjacent the circumferential flange, and a protecting flange on the bearing above the said groove.

4. In a bearing, a shaft mounted in said bearing and projecting therefrom, a circumferential flange on said shaft adjacent the bearing, said shaft having a groove adjacent the circumferential flange, and a protecting flange on the bearing above the said groove and extending partly around the grooved portion of the shaft.

5. The combination with a pouring device having a bail, bearings on the ends of said bail, trunnions mounted in said bearings and projecting therefrom, a container carried by said trunnions and tiltably mounted within the bail, and protecting flanges on said bearings overhanging portions of said trunnions which project from the bearings, all portions of the flanges being spaced from the trunnions, and the trunnions being exposed for a distance inwardly from the ends of the flanges.

6. The combination with a pouring device having a bail, bearings on the ends of said bail, trunnions mounted in said bearings and projecting therefrom, a container carried by said trunnions and tiltably mounted within the bail, and semi-circular protecting flanges on said bearings overhanging portions of said trunnions which project from the bearings, all portions of the flanges being spaced from the trunnions, and the trunnions being exposed fro a distance inwardly from the ends of the flanges.

7. The combination with a pouring device having a bail, bearings on the ends of said bail, trunnions mounted in said bearings and projecting therefrom, a container carried by said trunnions and tiltably mounted within the bail, said trunnions having grooves, and protecting flanges on said bearings above the said grooves.

8. The combination with a pouring device having a bail, bearings on the ends of said bail, trunnions mounted in said bearings and projecting therefrom, a container carried by said trunnions and tiltably mounted within the bail, a circumferential flange on each of said trunnions adjacent the bearings and between the bearings and the container, each trunnion adjacent the said flanges having a groove, and a protecting flange on each bearing above the adjacent groove.

9. The combination with a pouring device having a bail, bearings on the ends of said bail, trunnions mounted in said bearings and projecting therefrom, a container carried by said trunnions and tiltably mounted within the bail, a circumferential flange on each of said trunnions adjacent the bearings, each trunnion adjacent the said flanges having a groove, and a semi-circular protecting flange on each bearing above the adjacent groove.

In testimony whereof, I affix my signature.

MAX W. GOLDBERG.